United States Patent [19]
Buddenhagen et al.

[11] Patent Number: 5,407,715
[45] Date of Patent: * Apr. 18, 1995

[54] ELASTOMERIC TRIBLOCK COPOLYMER COMPOSITIONS AND ARTICLES MADE THEREWITH

[75] Inventors: Douglas A. Buddenhagen, San Diego; Norman R. Legge, Rancho Palos Verdes, both of Calif.; Gunter Zscheuschler, Birkenau, Germany

[73] Assignee: Tactyl Technologies, Inc., Vista, Calif.

[ * ] Notice: The portion of the term of this patent subsequent to May 12, 2009 has been disclaimed.

[21] Appl. No.: 779,725

[22] Filed: Oct. 23, 1991

Related U.S. Application Data

[63] Continuation-in-part of Ser. No. 619,218, Nov. 28, 1990, Pat. No. 5,112,900.

[51] Int. Cl.⁶ .............................................. B32B 1/08
[52] U.S. Cl. ................... 428/35.7; 428/36.92; 428/36.8; 428/212; 428/339; 604/19; 604/280; 604/158; 604/317; 604/318
[58] Field of Search ............... 524/484, 485, 486, 490, 524/491, 505; 604/93, 96, 19, 280, 158, 317, 318; 428/34.1, 76, 35.7, 36.8, 36.92, 332, 339, 212, 500

[56] References Cited

U.S. PATENT DOCUMENTS

| | | | |
|---|---|---|---|
| 2,133,947 | 10/1938 | Boecler | 18/24 |
| 2,371,883 | 3/1945 | Gammeter et al. | 18/58 |
| 2,847,715 | 8/1958 | Dosmann | 18/58.4 |
| 3,025,403 | 3/1962 | Belknap et al. | 250/108 |
| 3,059,241 | 10/1962 | O'Brien et al. | 2/167 |
| 3,225,360 | 12/1965 | Keilen, Jr. et al. | 2/167 |
| 3,286,011 | 11/1966 | Kavalir et al. | 264/106 |
| 3,397,265 | 8/1968 | Ansell | 264/306 |
| 3,485,787 | 12/1969 | Haefele et al. | 260/33.6 |
| 3,563,244 | 2/1971 | Asaka | 128/294 |
| 3,830,767 | 8/1974 | Condon | 260/28.5 |
| 3,933,723 | 1/1976 | Grenness | 260/33.6 |
| 4,006,116 | 2/1977 | Dominguez | 260/33.6 |
| 4,039,629 | 8/1977 | Himes | 260/876 B |
| 4,041,103 | 8/1977 | Davison et al. | 260/857 B |
| 4,061,709 | 12/1977 | Miller et al. | 264/293 |
| 4,070,713 | 1/1978 | Stockum | 2/168 |
| 4,386,179 | 5/1983 | Sterling | 524/269 |
| 4,481,323 | 11/1984 | Sterling | 524/269 |
| 4,511,354 | 4/1985 | Sterling | 604/98 |
| 4,613,640 | 9/1986 | Deisler et al. | 524/264 |
| 4,684,490 | 8/1987 | Taller et al. | 264/296 |
| 4,742,578 | 5/1988 | Seid | 2/2.5 |
| 4,769,415 | 9/1988 | Hotta et al. | 525/89 |
| 4,808,174 | 2/1989 | Sorkin | 128/644 |
| 4,880,878 | 11/1989 | Himes et al. | 525/89 |
| 4,970,259 | 11/1990 | Mitchell et al. | 524/505 |

FOREIGN PATENT DOCUMENTS

| | | |
|---|---|---|
| 0224389 | 6/1987 | European Pat. Off. . |
| 0254346 | 1/1988 | European Pat. Off. . |
| 2552636 | 5/1976 | Germany . |

OTHER PUBLICATIONS

"KratonR Thermoplastic Rubber" by Shell Chemical Co. (Oct. 1989).

(List continued on next page.)

Primary Examiner—Charles R. Nold
Attorney, Agent, or Firm—Gregory Garmong

[57] ABSTRACT

An elastomeric composition is formed of at least two, and preferably three, S-EB-S elastomeric triblock copolymers having different solution viscosity/copolymer concentration relationships, and a sufficient amount of a mineral oil plasticizer to achieve excellent tactility with acceptable strength. To prepare articles such as medical film protective devices, the elastomeric composition is dissolved in a sufficient amount of a solvent to permit dip forming. A form having the shape of the desired product is dipped into the solution to build up a film of the elastomeric composition on the form. The dip-formed elastomeric films are free of pinholes and resistant to oxidative and ozone attack. The films are particularly suitable for use in products such as gloves, condoms, external catheters, catheter balloons, cuffs, dilatation balloons, instrument covers, and drains.

14 Claims, 7 Drawing Sheets

U.S. PATENT DOCUMENTS

"Kraton Thermoplastic Rubber Medical Products", by Shell Chemical Co., Technical Bulletin SC:1032–88 (1988).

"Kraton G1650 Thermoplastic Rubber", by Shell Chemical Co., Technical Bulletin SC:38–85 (1985).

"Kraton G1652 Thermoplastic Rubber", by Shell Chemical Co., Technical Bulletin SC: (1985).

"Solution Behavior of Kraton Thermoplastic Rubbers", by Shell Chemical Co., Technical Bulletin SC:72–85 (1985).

"Gas Permeability of Kraton Rubbers", by Shell Chemical Co., Technical Bulletin SC:941–87 (1987).

"Kraton Thermoplastic Rubber–Typical Properties 1988", by Shell Chemical Co.

ASTM Standard Specification for Rubber Contraceptives (Condoms), D3492–83 (1983).

ASTM Standard Specification for Rubber Surgical Gloves, D3577–88 (1988).

ASTM Standard Specification for Rubber Examination Gloves, D3578–77 (1977).

F. T. J. Burke et al., "Some physical factors influencing tactile perception with disposable non–sterile gloves," J. Dent., vol. 17, pp. 72–76 (1989).

P. Gergen et al., "Hydrogenated Block Copolymers in Thermoplastic Elastomer IPNs", Chapter 14 (pp. 507–540) of *Thermoplastic Elastomers,* by N. R. Legge et al., 1987.

ELASTOMERIC TRIBLOCK COPOLYMER COMPOSITIONS AND ARTICLES MADE THEREWITH

This application is a continuation-in-part of application Ser. No. 07/619,218, filed Nov. 28, 1990, now U.S. Pat. No. 5,112,900 for which priority is claimed.

BACKGROUND OF THE INVENTION

This invention is related to the composition of an elastomeric triblock copolymer, and, additionally, to the use of such an elastomeric copolymer to prepare dip-formed articles.

Thin-walled, extensible articles such as gloves, condoms, and other medical products have long been made from natural rubber. In normal production, such articles are formed from natural rubber latex, a naturally occurring emulsion of rubber and water, with added stabilizing agents and vulcanizing chemicals. A form of the appropriate shape, previously coated with a coagulating solution in some cases, is dipped into the latex mixture once or several times to build up a layer of the desired thickness. The water is allowed to evaporate, leaving a solid rubber film. The film must be vulcanized to provide adequate mechanical and physical properties.

Natural rubber has many advantages in these applications, being strong and highly elastic and having good "tactility" or feeling to the user. The good tactility is believed to be a result of its low deformation stress at 10-500 percent elongations and high elastic recovery from these elongations. Natural rubber has the shortcoming that the resulting rubber film devices are sometimes prone to having "pinholes" therethrough, often on the order of micrometers in diameter. The pinholes are probably due to minute impurities in the natural latex which are difficult to filter out, and to the fact that the process converts a stable emulsion to a film by coagulating chemicals or heat. Natural rubber is also susceptible to rapid attack by ozone which causes scission cracking, as well as to oxidative attack during storage which causes cracking and destroys the physical integrity of the product. Even with these problems, for many applications the pinholes do not prevent the rubber article from having utility, and latex gloves, condoms, and other products are widely used. However, the presence of the pinholes is unacceptable in other applications, as for example where there is any possibility of the presence of the AIDS virus. Natural rubber is also not hypoallergenic due to the residual surfactants, vulcanizing agents, stabilizing agents, antioxidants, or protein materials in the rubber. Persons who are particularly susceptible to irritation or sensitization, or use the rubber products for extended periods of time may experience allergic reactions.

Various types of synthetic elastomeric polymer products have been developed for use in thin articles produced by dip forming. Synthetic rubber compositions can be dissolved in solvents to form a true solution, so that pinholes are much less likely to be present. Available synthetic rubber compositions have various other shortcomings, including unacceptable tactility. While each may meet some of the requirements, the known synthetic compositions do not have the required combination of strength, tactility, resistance to environmental damage, and hypoallergenicity required for many products such as examination and surgical gloves, condoms, and other medical products that are to come into contact with the human body. Several synthetic elastomeric systems have provided strength and tactility, but none has solved the problems related to environmental damage and hypoallergenicity required for surgical gloves and condoms.

There is therefore a need for an improved elastomeric material for use in thin, dip-formed articles used in a wide variety of applications, particularly medical applications. Such a material must have the required properties of strength and elastic elongation. It also must be pinhole free when the article is formed and used, resistant to immediate environmental damage occurring during storage or use, and hypoallergenic. The present invention fulfills this need, and further provides related advantages.

SUMMARY OF THE INVENTION

The present invention provides an elastomeric solution for dipping articles, an elastomeric composition, a process for preparing such dipped articles, and the articles themselves. The elastomeric blends have a combination of good strength and elasticity, together with a tactility comparable to natural rubber as shown by low deformation stress at 50-500% elongation and highly elastic recovery. Thin goods formed of the elastomers avoid the problem of pinholes, or, alternatively stated, have a high degree of impermeability. The elastomeric composition is not prone to scission cracking upon exposure to ozone or cracking upon aging, and is well suited for use in all types of thin goods formed by dipping.

In accordance with the invention, an elastomer liquid solution consists essentially of a block copolymer component comprising at least two S-EB-S triblock copolymers having different solution viscosity/copolymer concentration values; a plasticizer in an amount sufficient to provide tactility in dip formed products made from the composition: and a solvent in an amount sufficient to form a stable solution of the block copolymer component and the plasticizer and to permit dip forming of products from the liquid solution. Preferably, three S-EB-S block copolymers form the block copolymer component, tile plasticizer is mineral oil, and the plasticizer is present in an amount sufficient to reduce the deformation stress of the solid formed elastomer to less than about 5.5 MPa (millions of Pascals) at 500 percent elongation.

The liquid elastomer solution that is used to form thin solid articles has three principal ingredients, the block copolymers, the plasticizer, and tile solvent. The block copolymers are of the styrene-ethylene/butylene-styrene or S-EB-S type. Block copolymers of this family are inherently strong and of high modulus at intermediate elongations, leaning to a rather poor tactility in the final product. A plasticizer, preferably mineral oil, is added to the S-EB-S block copolymer to improve its tactility and elasticity, and reduce its modulus at intermediate elongations to improve its feel and tactility. An optimal balance of these properties, comparable to those of natural rubber, is achieved by using at least two, and preferably three, S-EB-S block copolymers of differing solution viscosity/copolymer concentration relationships in a solvent, in specific relative amounts. The solvent dissolves the block copolymers and the plasticizer to form a stable, true solution, rather than a mixture or an emulsion. Dipped articles exhibit a greatly reduced tendency to have pinholes when formed from a solution rather than a mixture. The amount of solvent must be sufficient to permit preparation of product by dipping procedures.

In accordance with the processing aspect of the invention, a process for the preparation of elastomer articles comprises the steps of furnishing a liquid solution consisting essentially of at least two different S-EB-S block copolymers having different solution viscosity/copolymer concentration values, a sufficient amount of an oil to provide tactility in the dip molded products, and a sufficient amount of a solvent to permit dip molding of products; dipping a form into the solution and withdrawing the form from the solution; and evaporating the solvent from the film on the form, leaving a coherent extensible film on the form. The elastomeric block copolymers become physically crosslinked by the time the solid film forms, and no subsequent curing or vulcanizing is necessary.

The elastomer of the invention is most advantageously used to manufacture relatively thin articles that are to contact the human body during use. Such articles are preferably formed by dip forming. Examples of such articles include surgical gloves, examination gloves, condoms, dilatation balloons, inflatable cuffs for tracheostomy tubes and other applications, drains, external catheters, rectal catheters, catheter balloons, and instrument covers for probes or other portions of instruments that contact the body. These products are substantially free of pinholes and are highly impermeable to small particles, viruses, bacteria, and the like. The integrity of the article is maintained even after storage and/or exposure in ultraviolet light, ozone, and oxidizing conditions.

Other features and advantages of the invention will be apparent from the following more detailed description of the preferred embodiment, taken in conjunction with the accompanying drawings, which illustrate, by way of example, the principles of the invention.

DETAILED DESCRIPTION OF THE PREFERRED EMBODIMENTS

In accordance with a preferred aspect of the invention, an elastomer liquid solution consists essentially of a block copolymer component comprising at least two S-EB-S block copolymers, each block copolymer having from about 25 to about 35 percent by weight of polystyrene blocks, the total mass of S-EB-S block copolymers having from about 40 to about 60 percent by weight of a first S-EB-S block copolymer with a solution viscosity of about 6500 cps at 25 percent by weight of copolymer in toluene at 77F, and from about 60 to about 40 percent by weight of a second S-EB-S block copolymer with a solution viscosity of about 2000 cps in toluene at 10 percent weight of polymer in toluene at 77F; a plasticizer in an amount of from about 30 to about 65 parts by weight of the total mass of the S-EB-S block copolymer component; and an organic solvent for the block copolymer component and the plasticizer.

Even more preferably, an elastomer liquid solution consists essentially of a block copolymer component comprising three S-EB-S block copolymers, each block copolymer having from about 25 to about 35 percent by weight of polystyrene blocks, the total mass of S-EB-S block copolymers having from about 40 to about 60 percent by weight of a first S-EB-S block copolymer having a solution viscosity of about 6500 cps at 25 percent by weight of copolymer in toluene at 77F, from about 15 to about 59 percent by weight of a second S-EB-S block copolymer having a solution viscosity of about 2000 cps in toluene at 10 percent weight of polymer in toluene at 77F, and from about 1 to about 40 percent by weight of a third S-EB-S block copolymer having a solution viscosity of about 1600 cps in toluene at 25 percent weight of polymer in toluene at 77F; a plasticizer in an amount of from about 30 to about 6 5 parts by weight of the total mass of the S-EB-S block copolymer component; and an organic solvent for the block copolymer component and the plasticizer.

The polymer base for the elastomer is a styrene-ethylene-butylene-styrene (S-EB-S) block copolymer formed from an ethylene-butylene copolymer central block and styrene end blocks. The polystyrene end blocks typically constitute about 25–35 percent by weight of the total molecule. The total molecular weight of the copolymer is typically from about 50,000 to about 300,000. The different copolymers have different solution viscosity/copolymer concentration relationships in a selected solvent such as toluene under selected conditions.

The S-EB-S block copolymer is to be distinguished from other block copolymers that have sometimes been used in synthetic rubber compositions, such as styrene-isoprene-styrene (S-I-S) and styrene-polybutydiene-styrene (S-B-S) block copolymers. It has been known to make thin rubberlike articles from S-I-S and S-B-S block copolymers, see for example, U.S. Pat. No. 9,999,729. The use of these block copolymers eliminates the need for vulcanization of the articles, but the articles are subject to oxidation and ozone damage.

The use of an S-EB-S block copolymer, as distinct from other types, is critical to the success of the present invention, for two reasons. First, elastomers based upon the S-EB-S block elastomeric triblock copolymers are resistant to attack by ozone, or by oxidative conditions, while S-I-S and S-B-S elastomers suffer from rapid cracking, when exposed to ozone, and cracking or hardening under oxidative conditions. Both of the latter copolymers are thus subject to failure even when protected by specific additives such as antiozonants or antioxidants which are deleterious in medical and other applications. The use of such special additives is undesirable, as they may cause allergic reactions in some per sons. The present elastomeric composition is hypoallergenic and may be contacted with the skin of the user for extended periods of time. Additionally, in spite of the special additives, scission cracking can lead to premature failure by ozone cracking of the articles made from S-I-S and S-B-S compositions, particularly when the articles are stored in a folded condition and then stretched before and during use.

Second, the mechanical properties of the S-EB-S triblock copolymers can be modified to provide the desirable combination of tensile strength, elasticity, and tactility that is required in some applications. S-EB-S elastomeric triblock copolymers have higher tensile strength, lower elastic elongation, and higher stress at 50–500 percent elongation than the S-I-S and S-B-S triblock elastomers. By themselves, individual S-EB-S block copolymers are unacceptable for the applications described herein owing to their unacceptably high stress at low elongations and resulting insufficient tactility. With appropriate combination of at least two, and preferably three, S-EB-S elastomers and a suitable plasticizer such as a nonaromatic napthenic mineral oil, the elastomeric properties are ideal for these applications. The plasticizer should not swell or solubilize the polystyrene end segments.

The structure, properties, and some applications of some S-EB-S rubbers have been disclosed in U.S. Pat. Nos. 3,485,787; 3,830,767; 4,006,116; 4,039,629; 4,041,103; 4,386,179; 4,481,323; 4,511,354; and 4,613,640, whose disclosures are incorporated by reference.

By way of comparison, U.S. Pat. Nos. 4,386,179, 4,481,323, 4,511,354, and 4,613,640 disclose compositions of triblock elastomeric copolymers with 0.1 to 7–10 percent of polysiloxane and 6–60 percent mineral oil. The addition of the polysiloxane in this range is essential to obtain marked improvements in surface smoothness that is microscopically characteristic of silicone rubber. This improved surface smoothness is necessary to many medical applications in contact with body tissue and fluids. These blends of triblock copolymers, polysiloxane, and mineral oil require formation of the stable triblock copolymer and polysiloxane composition at high temperatures and shearing pressures on the order of 1500–2500 psi (pounds per square inch). It is not practically and commercially possible to form solutions from these compounds, and to dip mold thin elastomeric articles such as gloves and condoms from these compositions.

The S-EB-S block copolymers are available commercially in a range of solution viscosity/copolymer concentration values. The solution viscosity/copolymer concentration value is determined by measuring the viscosity of a copolymer that has been previously dissolved in a solvent at a specified level. Solution viscosity/copolymer concentration value is a conventional approach for uniquely defining the nature of a block copolymer whose central and end block content has been specified by type and relative amount. For example, an S-EB-S block copolymer is uniquely specified by the stated composition of polystyrene end blocks and poly-b-ethylene-butylene central blocks, the relative amount of end blocks and central blocks, and the solution viscosity/copolymer concentration. Thus, a copolymer is uniquely defined by stating that it is of the S-EB-S type, that the percentage of polystyrene end blocks is, for example, 30 percent by weight of the total copolymer, and that the solution viscosity of a 25 weight percent solution in toluene at 77F is 6500 centipoise. The commercially available S-EB-S block copolymers are manufactured in a precise manner so that each of the commercially available materials is closely controlled to meet such standards.

For reasons that will be discussed, the S-EB-S block copolymers are mixed with a plasticizer. The plasticizer is preferably a mineral oil, which is a refined petroleum napthenic hydrocarbon oil described in Entries 6971 and 6972 of the Merck Index, Eighth Edition. The preferred mineral oil has a specific gravity of 0.87 at 77F, a viscosity of 170 centistokes at 77F, and a Hirschler molecular weight of 492.

The S-EB-S block copolymer is furnished by the manufacturer as a solid. To form a solution from which articles can be dip formed, the S-EB-S block copolymers and the mineral oil plasticizer are dissolved in a mutual solvent, preferably toluene, to an optimal concentration of S-EB-S. Toluene solutions of S-EB-S provide minimal viscosities of concentrated solutions compared to many other solvents. A highly concentrated solution improves dip-forming process economics by reducing the amount of solvent that must be processed in a solvent recovery operation. The S-EB-S in toluene solution is a true, stable solution, as distinct from a mixture or an emulsion. The process requires attaining such a solution, as by using a high shear mixer and mixing for a sufficient time to reach a homogeneous solution. The solution is filtered to remove any fine particulate matter.

A number of specimens were prepared and tested in order to establish preferred compositions and approaches. In each case, the indicated composition was formulated. A test sample was prepared, and evaluated for strength and elongation, and also for tactility. "Tactility" was Judged by both objective and subjective standards. The objective standard was the deformation stress (modulus) at intermediate elongations. The modulus must be less than about 7.0 MPa at 500 percent elongation, and desirably is less than about 5.5 MPa at 500 percent elongation to satisfy the more stringent requirements of ASTM D3577-88, Type I.

The objective tactility determinations based upon intermediate modulus were verified by review of "feel" and elasticity of the products by persons familiar with the articles and who use such articles in their professional duties, such as dentists and surgeons. Condoms were also evaluated by persons familiar with their use. These subjective evaluations were considered to be important, because the ultimate standard for acceptable tactility is the product acceptability to users. Each person was asked to give an evaluation of whether the product had the necessary combination of fit, elasticity, and tactility to be acceptable and comfortable as a glove to be worn for extended periods of time, or as a condom. In general, the results of subjective tactility evaluations were consistent with the objective intermediate modulus standard, with only minor differences as will be discussed.

No single S-EB-S molecular weight copolymer, extended by mineral oil plasticizer, has been found operable to meet the strength, extensibility, tactility, and dip forming capability required for the intended thin-film applications. A mixture of at least two, and preferably three, S-EB-S copolymers of different solution viscosities, extended with a selected range of plasticizer, has been found to meet all of these requirements.

By themselves, S-EB-S triblock copolymers have high tensile strengths, but also high values of deformation stress (modulus) at 50–500 percent elongation.

Figure 1:
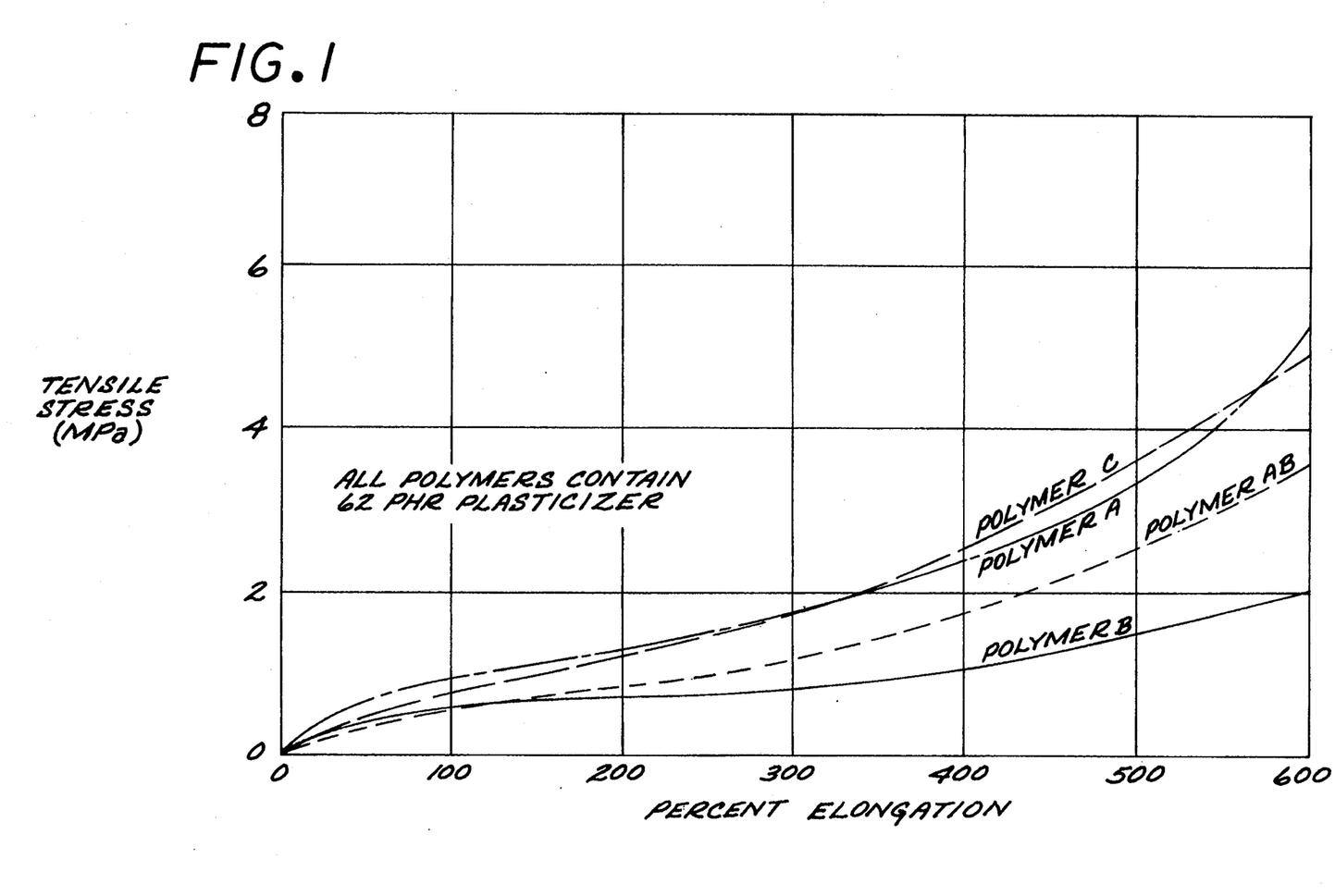
FIG. 1 is a graph depicting deformation stress as a function of elongation for several block copolymers.
Figure 2:
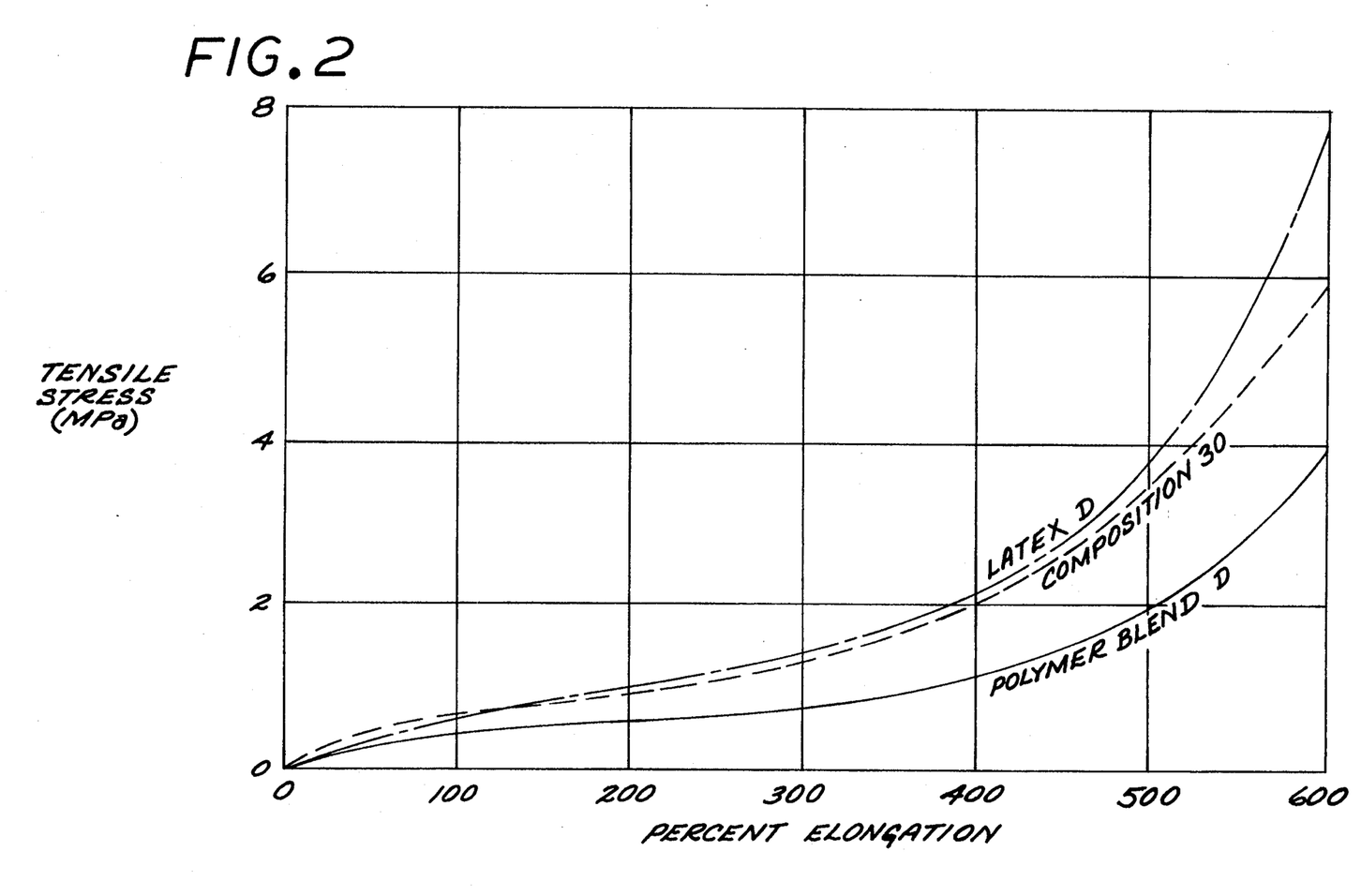
FIG. 2 is a graph depicting deformation stress as a function of elongation for natural latex and for triblock copolymer and plasticizer blends.

These values of deformation stress are much too high for use in many thin-film products such as gloves and condoms. FIGS. 1 and 2 present deformation stress as a function of elongation ("modulus" plot) for thin films of several different block copolymers and block copolymer combinations, all having an addition of 62 parts of plasticizer per hundred parts of block copolymer. Results of similar tests of a natural rubber latex composition are included for comparison (latex-D). Block copolymer A is an S-EB-S block copolymer having from 25–35 percent by weight polystyrene blocks and a solution viscosity of about 6500 cps at 25 percent by weight of copolymer in toluene at 77F. Block copolymer B is an S-EB-S block copolymer having from 25–35 percent by numerical count polystyrene blocks and a solution viscosity of about 2000 cps at 10 percent by weight of copolymer in toluene at 77F. Block copolymer C is an S-EB-S block copolymer having from 25–35 percent by weight polystyrene blocks and a solution viscosity of about 1600 cps at 25 percent by weight of copolymer in toluene at 77F. Such S-EB-S block copolymers are available commercially. The plasticizer is the preferred mineral oil.

The observed relationship between deformation stress and solution viscosity is unexpected. Polymer B, having the highest solution viscosity, produced films having the lowest deformation stress at intermediate strains. Polymer A, with significantly lower polymer solution viscosity, showed higher deformation stress values than polymer B. Polymer E, having the lowest solution viscosity, produced the highest deformation stress values at intermediate strains. However, a mixture of 50 percent by weight polymer A, 33 percent by weight polymer B, and 17 percent by weight polymer C (referred to as polymer blend D), and a mixture of 50 weight percent of polymer A and 50 weight percent of polymer B (referred to as polymer AB), both produced a deformation stress at 500 percent elongation on the same order as, or lower than, natural latex-D. This result indicated that these mixtures provide tactility as good as, or better than, that of natural rubber.

Figure 3:
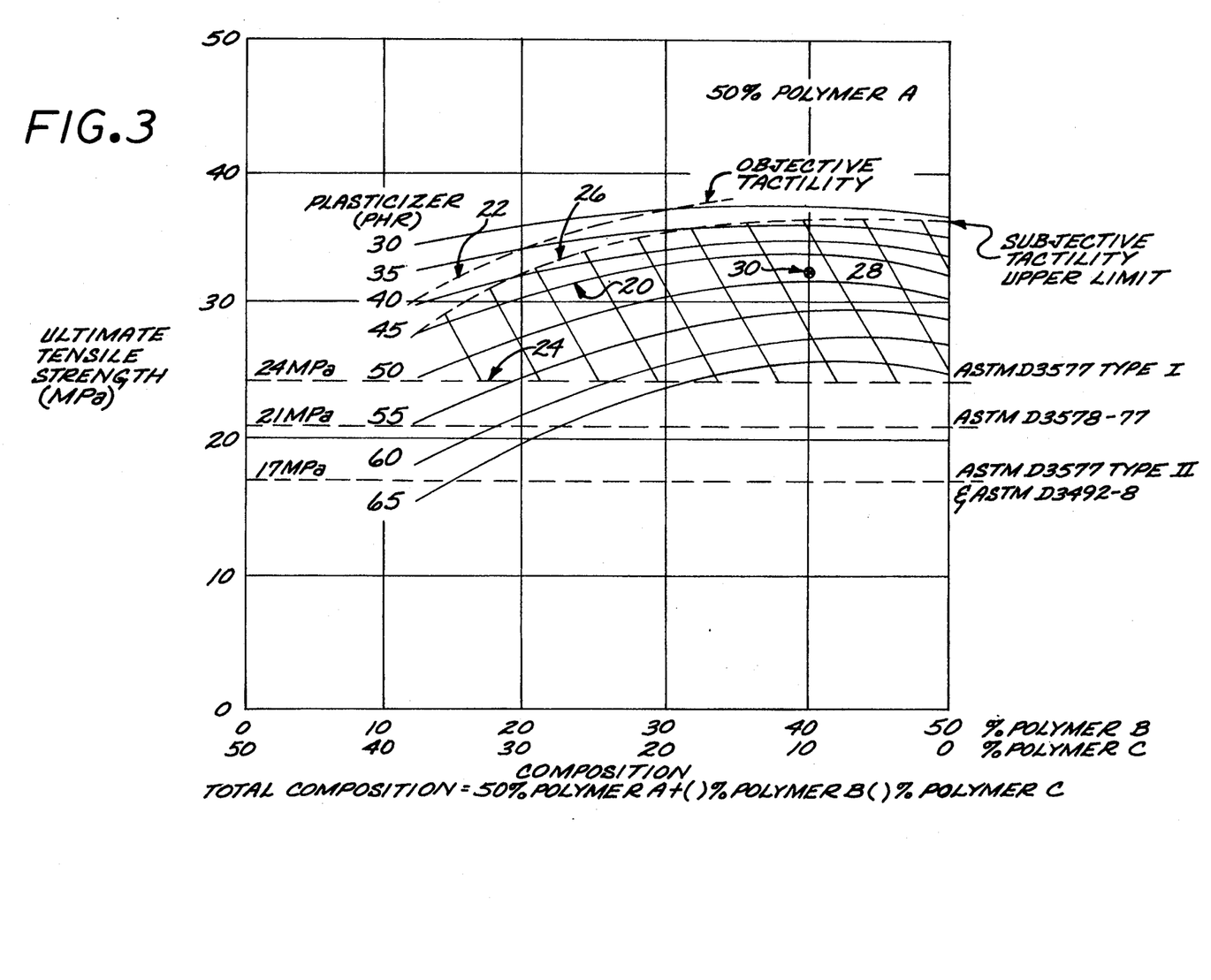
FIG. 3 is a graph depicting the ultimate tensile stress and tactility properties as a function of the elastomeric composition and plasticizer content.
Figure 4:
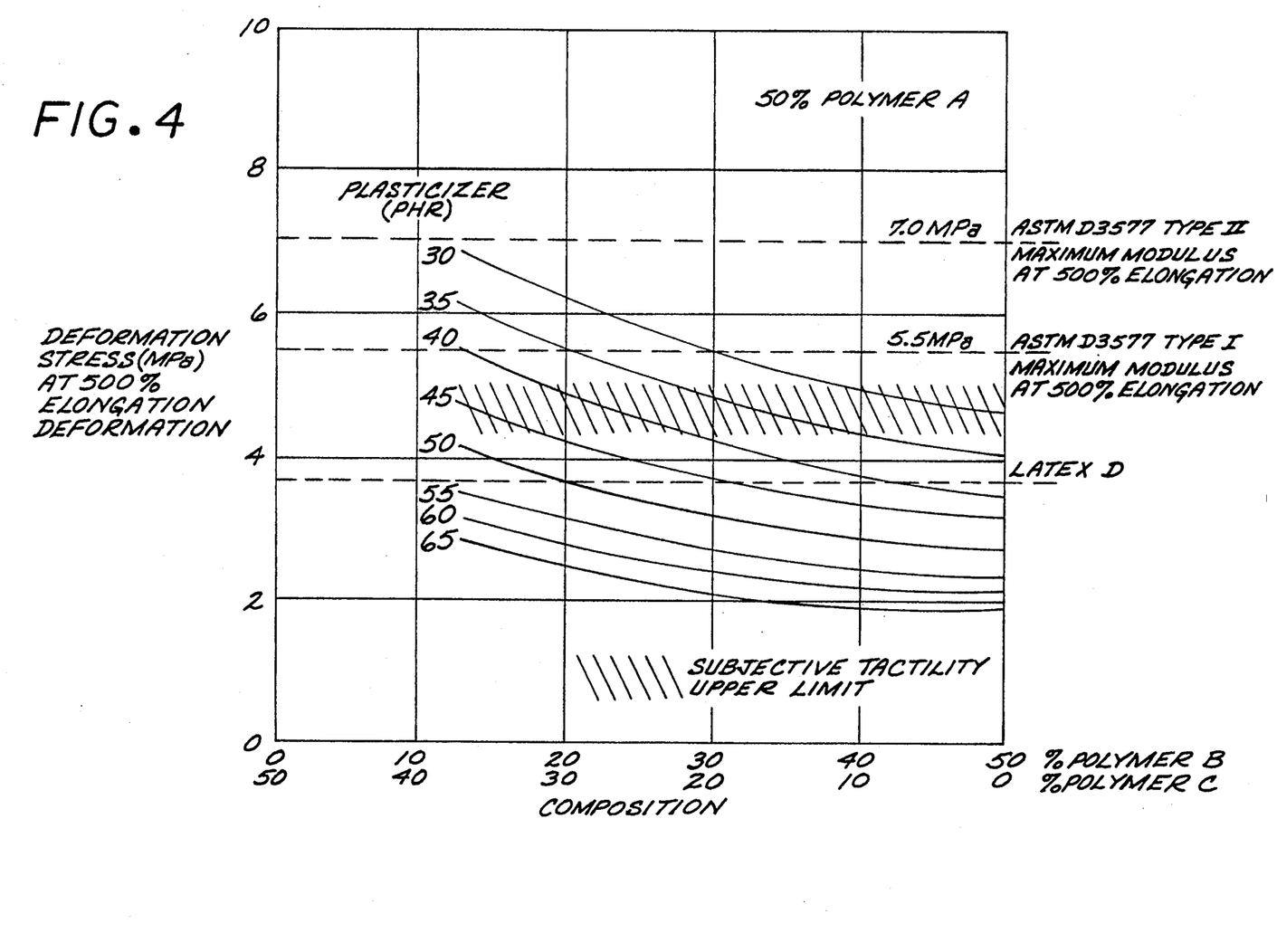
FIG. 4 is a graph depicting the deformation stress at 500 percent elongation as a function of the elastomeric composition and plasticizer content.

The ultimate tensile strength (i.e., breaking strength) of thin rubber products such as gloves and condoms is an important factor in their utilization. FIG. 3 presents the ultimate tensile strength of S-EB-S polymer mixes as a function of composition, for a constant 50 weight percent polymer A and varying amounts of polymers B and C, as indicated on the horizontal axis. Also included in the graph are the results of varying the amount of plasticizer from 30 parts per hundred of copolymer to 65 parts per hundred of copolymer. FIG. 4 presents the deformation stress and 500 percent elongation for the same mixes, in a similar format.

The American Society for Testing and Materials has established Standard ASTM D3577-88 for rubber surgical gloves, Standard ASTM D3578-77 for rubber examination gloves, and Standard ASTM D3492-89 for rubber contraceptives (condoms). Each of these standards establishes a minimum ultimate tensile strength for the specified product under particular conditions. In FIG. 3, the ASTM line at 24 MPa is that minimum ultimate tensile strength specified for Type I (natural latex) surgical gloves in ASTM D3577-88. The ASTM line at 17 MPa is that specified for Type II (Synthetic rubber latex or rubber cement) surgical gloves in ASTM D3577-88 and that specified for condoms in ASTM D3492-83. The ASTM line at 21 MPa is that specified for examination gloves in ASTM D3578-77. The ASTM standards also establish maximum deformation stress at 500 percent elongation. These values are shown in FIG. 4.

To be acceptable, the mechanical properties of the final article should have a tensile strength equal to or greater than that of the appropriate ASTM standard minimum tensile strength, FIG. 3, and equal to or less than the appropriate ASTM standard tensile or deformation stress at 500 percent elongation, FIG. 4. The results of FIGS. 3–4 establish that particular S-EB-S copolymer blends with specific amounts of plasticizer meet the ASTM standards and can achieve comparable, and in many cases superior, mechanical properties to those of natural latex. This result is significant, because it means that the material of the invention can perform mechanically in a manner comparable or superior to that of natural rubber, while avoiding the shortcomings of natural rubber such as susceptibility to pinholes, oxidative attack, ozone attack, and allergenicity. No other material is known which has all of these features.

Referring to FIGS. 3 and 4, the data represent ultimate tensile strength in FIG. 3 and deformation stresses at 500% elongation in FIG. 4, measured from the test specimens. The data points are connected by lines of constant mineral oil content, as for example the line 20. An objective "tactility" line 22 represents the compositions at which the modulus of the elastomer at 500 percent elongation was less than 5.5 MPa. The line 22 quantifies the dividing line between those compositions that meet the ASTM D3577-88 Type I specification and have sufficient tactility, and those which do not. Those compositions lying above the line 22 were judged unacceptable because they have too high a stress at 500% elongation, while those lying below the line 22 would be acceptable. The subjective tactility evaluation produced an upper tactility line 26 which is slightly below the line 22, resulting in a more stringent requirement to satisfy users of the products.

The strength (ultimate tensile stress) of the composition decreases noticeably at the extrema of the ratios of the copolymer components B and C. A minimum acceptable strength is represented by the "ASTM" line 24 in FIG. 3 for surgical gloves.

Those compositions which lie within an area 28 defined by the lines 24 and 26 are acceptable. Most preferably, compositions lying in the upper parts of the region 28 are selected for use, as they have the maximum strength consistent with acceptable tactility. A most preferred composition is indicated by point 30 on FIG. 3. This S-EB-S triblock copolymer blend has an optimum composition of 50 weight percent polymer A, 40 weight percent Polymer B, and 10 weight percent Polymer C, with 48 parts per hundred of polymer mineral oil plasticizer.

Single triblock copolymers of the S-EB-S type do not meet the ASTM standard and pass the tactility requirements when samples are prepared by the solution dipping approach. That a combination of two or three S-EB-S copolymers with a plasticizer meets the strength and tactility standards is surprising.

The inventors have performed other studies such as those of FIGS. 3 and 4, at other relative amounts of the copolymers. No compositions of a single S-EB-S block copolymer and a plasticizer could meet both the ultimate tensile strength and deformation stress at 500 percent elongation requirements of the ASTM standards. Blends of from about 40 to about 60 percent of copolymer A, balance copolymer B totaling 100 percent, plus from about 30 to about 65 parts by weight mineral oil plasticizer met the requirements. (Conventional practice in the art is to specify compositions as follows. The copolymer is specified on the basis of 100 percent total, and then the plasticizer is specified as additional parts by weight of the weight of the total copolymer mass. This approach is frequently referred to as parts per hundred of rubber, or phr.) In all cases, a sufficient amount of solvent is added to the composition to permit dip forming, as will be discussed subsequently.

Blends containing three copolymers are even more preferred, because they permit more flexibility in tailoring the properties of the final film to specific product needs and offer improved properties, as seen in the results of FIGS. 3 and 4. Blends of three S-EB-S triblock copolymers having from about 40 to about 60 percent of copolymer A, about 15 to about 59 percent of copolymer B, and about 1 to about 40 percent of copolymer C, with about 30 to about 65 parts by weight of the total copolymer mass of plasticizer, yielded satisfactory mechanical properties.

In all of these blends, substantial variations from the specified limits may result in an inability to meet the ultimate tensile strength and/or the modulus requirements of the ASTM standards, as suggested by the results of FIGS. 3 and 4. Smaller variations may produce equivalent structures that do meet the standards. However, in all cases the copolymer component is a combination of two or more S-EB-S triblock copolymers.

The formulations according to the invention are prepared by placing the block copolymers and mineral oil into a high shear mixer such as a Cowles dissolver, adding the solvent, and mixing for a sufficient time to attain a homogeneous solution, typically about one hour. The solution is set aside for a period of time, typically several hours, to deaerate.

Figure 5:
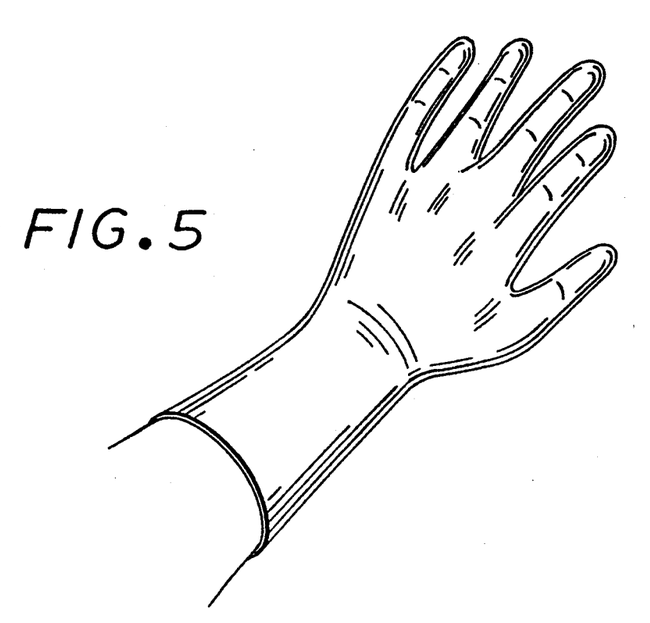
FIG. 5 is a perspective view of a glove.
Figure 6:
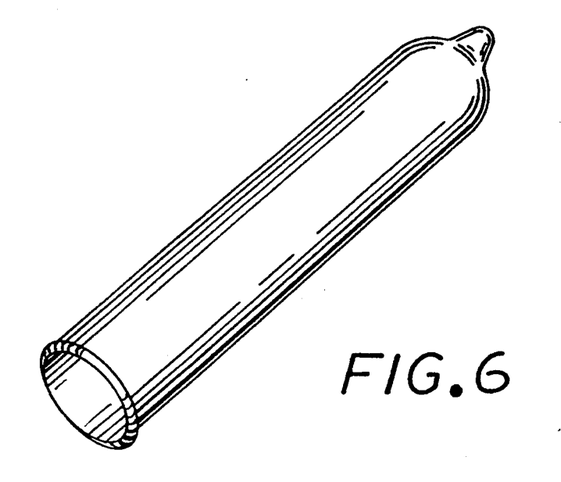
FIG. 6 is perspective view of a condom.

Articles including an elastomer glove, depicted in FIG. 5, and an elastomer condom, depicted in FIG. 6, were prepared from the most preferred composition and from other acceptable compositions. To prepare such an article, a sufficiently large amount of the elastomer solution is prepared in the manner described and placed into a dipping tank, at ambient temperature. A commercially available form (typically made of aluminum, glass, plastic, or porcelain) in the shape of the desired article is dipped into the tank and removed slowly, leaving a thin, uniform layer of the liquid elastomer solution deposited onto the form, much in the same manner that a layer of paint would be deposited upon the form if it were dipped into a container of paint. The form is dried in a stream of air for a predetermined time to permit the solvent in the thin elastomeric layer to evaporate, at ambient temperature. Each dipped and dried layer is about 0.03–0.20 millimeters thick. The dipping procedure is repeated as necessary to build up a layer of the required thickness. Thin articles prepared according to the dipping process of the invention have thicknesses of from about 0.03 to about 1.0 millimeter, depending upon the thickness per layer and the number of layers. It is difficult to maintain the integrity of layers of less than about 0.03 millimeters thickness. It is difficult to prepare articles more than about 1.0 millimeters thick by dip forming.

Elastomer gloves and condoms prepared from the most preferred composition and the dipping method Just described were tested as follows. Hypoallergenicity was demonstrated using a modified Draize technique first in animal models followed by a human protocol. The human tests screened for both irritation and immune mediated sensitization. The testing demonstrated that the compositions of S-EB-S triblock copolymers and plasticizer was non-irritating and non-sensitizing. Impermeability of the intact elastomer films was substantiated using three different live viruses, polio, HSV-1, and $T_7$-bacteriophage, with and without mechanical manipulation of the thin film during testing. The films were found to be impermeable. Comparative environmental oxidation tests were performed on S-I-S, S-B-S, S-EB-S, and natural rubber latex films, and S-EB-S blends according to the invention. S-I-S, S-B-S, and natural rubber latex showed severe scission cracking of the film surfaces after short exposure times to Southern California ambient ozone, ultraviolet radiation, and temperature extremes. The preferred composition of the invention showed no scission cracking when subjected to the same test.

The elastomer of the invention can be used to prepare articles other than gloves and condoms, and no limitation on the type of articles prepared is known. FIGS. 7–12 show examples of some other articles that can be prepared by dip forming the elastomer of the invention.

Figure 7:
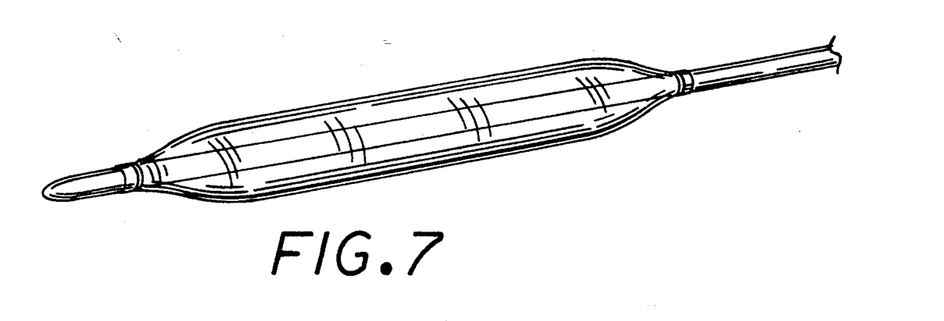
FIG. 7 is a perspective view of a dilatation balloon.

Dilatation balloons, such as shown in FIG. 7, are used in angioplasty procedures. The uninflated dilatation balloon is mounted on an instrument and inserted into a blood vessel to the location of a partial or total blockage. The dilatation balloon is inflated to compress the blockage outwardly and permit blood to flow again.

Figure 8:
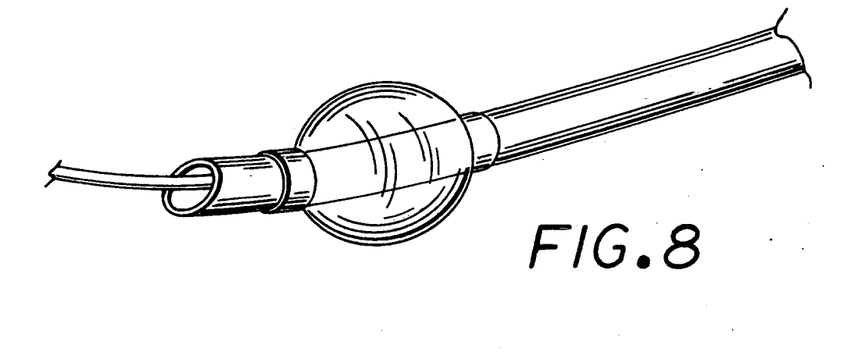
FIG. 8 is a perspective view of an inflatable cuff.

Inflatable cuffs, such as shown in FIG. 8, are used to hold instruments in place within the body. The cuff surrounds the instrument. The instrument is inserted into the body through an opening, and then the cuff is inflated to hold the instrument securely in place.

Figure 9:
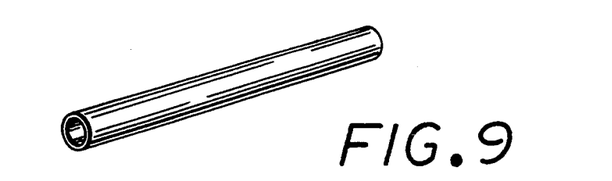
FIG. 9 is a perspective view of a surgical drain.

Drains, such as shown in FIG. 9, are pieces of tubing extending from within the body to outside the body to permit the draining of fluids from the body.

Figure 10:
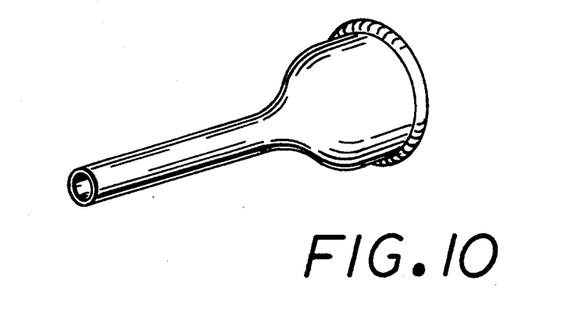
FIG. 10 is a perspective view of an external catheter.

External catheters, such as shown in FIG. 10, are placed over the penis to remove urine.

Figure 11:
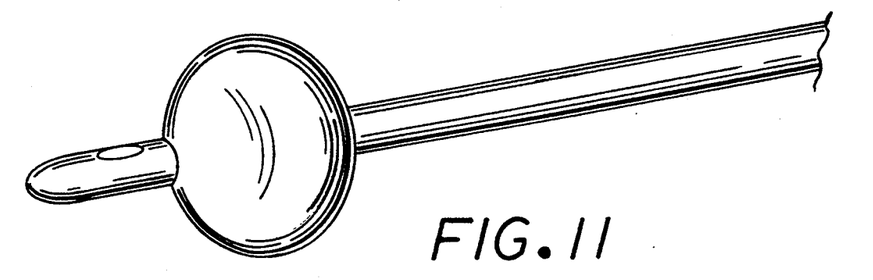
FIG. 11 is a perspective view of a catheter balloon.

Catheter balloons, such as shown in FIG. 11, are of several types. Generally, however, the catheter balloon functions in a manner somewhat similar to an inflatable cuff. The catheter is inserted into the body with the balloon deflated. When the catheter reaches its intended location, the catheter balloon is inflated.

Figure 12:
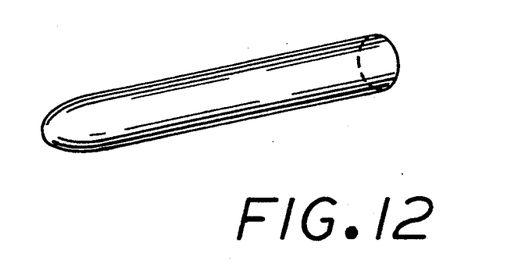
FIG. 12 is a perspective view of an instrument cover.

Instrument covers, such as shown in FIG. 12, are also of several types. Generally, some portion of an instrument must be placed into contact with the body for a period of time. The instrument cover covers and protects that portion of the instrument, such as a probe, and prevents it from contacting the body.

The feature common to these articles of most interest is that they are used in medically related applications where they must be elastomeric and must also contact the body (either externally or internally) for a period of time. The elastomer of the present invention is resistant to environmental damage so that the operability of the articles is less subject to adverse environmental influences, and also does not cause allergic or other adverse reaction in the patient or the health care worker.

The present invention provides an improved elastomer formulation for the preparation of dip-formed articles having properties superior to those previously available. Although particular embodiments of the invention have been described in detail for purposes of illustration, various modifications may be made without departing from the spirit and scope of the invention.

Accordingly, the invention is not to be limited except as by the appended claims.

What is claimed is:

1. An elastomeric article, comprising a thin film having a thickness of frown about 0.03 to about 1.0 millimeter, the film being formed of an elastomer comprising a block copolymer component comprising at least two S-EB-S block copolymers, each block copolymer having from about 25 to about 95 percent by weight of polystyrene blocks, the total mass of S-EB-S block copolymers having from about 40 to about 60 percent by weight of a first S-EB-S block copolymer with a solution viscosity of about 6500 cps at 25 percent by weight of copolymer in toluene at 77F, and from about 60 to about 40 percent by weight of a second S-EB-S block copolymer with a solution viscosity of about 2000 cps in toluene at 10 percent weight of polymer in toluene at 77F, and a plasticizer in an amount of from about 30 to about 65 parts by weight of the total mass of the S-EB-S block copolymer component.

2. The article of claim 1, wherein the article is formed as a dilatation balloon.

3. The article of claim 1, wherein the article is formed as an inflatable cuff.

4. The article of claim 1, wherein the article is formed as a surgical drain.

5. The article of claim 1, wherein the article is formed as a catheter balloon.

6. The article of claim 1, wherein the article is formed as an instrument cover.

7. An elastomeric article, comprising a thin film having a thickness of from about 0.03 to about 1.0 millimeter, the film being formed of an elastomer comprising a block copolymer component comprising three S-EB-S block copolymers, each block copolymer having from about 25 to about 35 percent by weight of polystyrene blocks, the total mass of S-EB-S block copolymers having from about 40 to about 60 percent by weight of a first S-EB-S block copolymer having a solution viscosity of about 6500 cps at 25 percent by weight of copolymer in toluene at 77F, from about 15 to about 59 percent by weight of a second S-EB-S block copolymer having a solution viscosity of about 2000 cps in toluene at 10 percent weight of polymer in toluene at 77F, and from about 1 to about 40 percent by weight of a third S-EB-S block copolymer having a solution viscosity of about 1600 cps in toluene at 25 percent weight of polymer in toluene at 77F, and a plasticizer in an amount of from about 30 to about 65 parts by weight of the total mass of the S-EB-S block copolymer component.

8. The article of claim 7, wherein the article is formed as a dilatation balloon.

9. The article of claim 7, wherein the article is formed as an inflatable cuff.

10. The article of claim 7, wherein the article is formed as a surgical drain.

11. The article of claim 7, wherein the article is formed as a catheter balloon.

12. The article of claim 7, wherein the article is formed as an instrument cover.

13. The article of claim 1, wherein the article is formed as an external catheter.

14. The article of claim 7, wherein the article is formed as an external catheter.

* * * * *